(12) United States Patent
Nakamura et al.

(10) Patent No.: US 11,655,162 B2
(45) Date of Patent: May 23, 2023

(54) METHOD OF REMOVING BORON FROM WATER TO BE TREATED, BORON-REMOVING SYSTEM, ULTRAPURE WATER PRODUCTION SYSTEM, AND METHOD OF MEASURING CONCENTRATION OF BORON

(71) Applicant: ORGANO CORPORATION, Tokyo (JP)

(72) Inventors: Yuki Nakamura, Tokyo (JP); Chika Kemmochi, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 188 days.

(21) Appl. No.: 17/252,914

(22) PCT Filed: Apr. 5, 2019

(86) PCT No.: PCT/JP2019/015130
§ 371 (c)(1),
(2) Date: Dec. 16, 2020

(87) PCT Pub. No.: WO2019/244443
PCT Pub. Date: Dec. 26, 2019

(65) Prior Publication Data
US 2021/0261445 A1    Aug. 26, 2021

(30) Foreign Application Priority Data
Jun. 20, 2018    (JP) .............................. JP2018-117270

(51) Int. Cl.
*C02F 1/42*    (2023.01)
*C02F 1/44*    (2023.01)
(Continued)

(52) U.S. Cl.
CPC ............ *C02F 1/441* (2013.01); *B01D 61/025* (2013.01); *B01D 61/10* (2013.01); *C02F 1/42* (2013.01);
(Continued)

(58) Field of Classification Search
CPC .... C02F 1/441; C02F 1/42; C02F 1/58; C02F 1/66; C02F 2001/425; C02F 2101/108;
(Continued)

(56) References Cited

U.S. PATENT DOCUMENTS 4,871,431 A * 10/1989 Parsi ..................... C02F 1/4695
                                                        204/632
5,811,012 A *  9/1998 Tanabe ...................... C02F 1/44
                                                        210/257.2
(Continued)

FOREIGN PATENT DOCUMENTS

CN    1236330    * 11/1999   .......... B01D 61/026
CN    1507417 A    6/2004
(Continued)

OTHER PUBLICATIONS

Office Action issued in Chinese Patent Application No. 201980019974.5 dated Jan. 30, 2022, along with English translation thereof.
(Continued)

*Primary Examiner* — Joseph W Drodge
(74) *Attorney, Agent, or Firm* — Greenblum & Bernstein, P.L.C.

(57) ABSTRACT

A method of removing boron from water to be treated includes subjecting the water to be treated to reverse osmosis membrane treatment, subjecting at least part of permeated water after the reverse osmosis membrane treatment to cation-removing treatment, and measuring a concentration of boron in the resulting permeated water after the cation-removing treatment, in which a measured value for the
(Continued)

concentration of boron is used to regulate at least one of: (a) the recovery rate of water to be treated in the above reverse osmosis membrane treatment, (b) the temperature of the water to be treated, (c) the pH of the water to be treated, (d) the supply pressure of the water to be treated, which pressure is applied to the reverse osmosis membrane during the reverse osmosis membrane treatment, and (e) when the reverse osmosis membrane used for the reverse osmosis membrane treatment should be changed.

10 Claims, 3 Drawing Sheets

(51) Int. Cl.
| | |
|---|---|
| C02F 1/58 | (2023.01) |
| C02F 1/66 | (2023.01) |
| B01D 61/02 | (2006.01) |
| B01D 61/10 | (2006.01) |
| C02F 101/10 | (2006.01) |
| C02F 103/04 | (2006.01) |

(52) U.S. Cl.
CPC ............ *C02F 1/58* (2013.01); *C02F 1/66* (2013.01); *B01D 2311/2623* (2013.01); *C02F 2001/425* (2013.01); *C02F 2101/108* (2013.01); *C02F 2103/04* (2013.01); *C02F 2209/02* (2013.01); *C02F 2209/06* (2013.01)

(58) Field of Classification Search
CPC .............. C02F 2103/04; C02F 2209/02; C02F 2209/06; C02F 1/008; C02F 2209/003; C02F 2209/03; C02F 1/20; C02F 1/4695; C02F 1/44; C02F 2209/008; C02F 2209/08; C02F 1/0008; C02F 2301/08; B01D 61/02; B01D 61/12; B01D 61/44; B01D 61/58; B01D 61/025; B01D 61/08; B01D 61/10; B01D 2311/10; B01D 2311/14; B01D 2311/18; B01D 2311/246; B01D 2311/25; B01D 2311/251; B01D 2311/2623; B01J 39/05; B01J 39/18; B01J 41/05; B01J 41/12; B01J 47/022; B01J 47/04; B01J 47/127; B01J 49/53; B01J 39/00; B01J 39/08; B01J 47/14; B01J 47/145
See application file for complete search history.

(56) References Cited

U.S. PATENT DOCUMENTS

| | | | | |
|---|---|---|---|---|
| 5,925,255 | A * | 7/1999 | Mukhopadhyay ... | B01D 61/026 210/651 |
| 9,902,628 | B2 * | 2/2018 | Broschek Santelices | C02F 1/42 |
| 2002/0125191 | A1 * | 9/2002 | Mukhopadhyay ..... | B01D 65/08 210/652 |
| 2003/0230531 | A1 * | 12/2003 | Wilf ........................ | C02F 1/441 210/639 |
| 2006/0121491 | A1 * | 6/2006 | Wolber ................ | C12Q 1/6837 435/6.1 |
| 2006/0231491 | A1 * | 10/2006 | Mukhopadhyay ........ | C02F 9/00 423/580.1 |
| 2012/0037565 | A1 * | 2/2012 | Roh ........................ | C02F 1/288 564/443 |
| 2014/0138318 | A1 | 5/2014 | Gensbittel | |
| 2017/0081215 | A1 * | 3/2017 | Broschek Santelices | B01D 15/361 |
| 2017/0327396 | A1 * | 11/2017 | Ikuno ................. | B01D 19/0031 |

FOREIGN PATENT DOCUMENTS

| | | | | | |
|---|---|---|---|---|---|
| CN | 1642634 | A | 7/2005 | | |
| CN | 101410169 | A | 4/2009 | | |
| CN | 107170505 | A | 9/2017 | | |
| JP | 8-117744 | A | 5/1996 | | |
| JP | 9-290275 | A | 11/1997 | | |
| JP | 11-128921 | A | 5/1999 | | |
| JP | 2005-342587 | A | 12/2005 | | |
| JP | 2006-167568 | A | 6/2006 | | |
| JP | 2010-216823 | A | 9/2010 | | |
| JP | 2013-250278 | A | 12/2013 | | |
| JP | 2014-100706 | A | 6/2014 | | |
| JP | 2017-131846 | A | 8/2017 | | |
| JP | 2018-58018 | A | 4/2018 | | |
| KR | 10-2000-0029977 | A | 5/2000 | | |
| WO | WO03086629 | | * 10/2003 | ............ | B01J 49/60 |
| WO | WO03106348 | | * 12/2003 | ........... | B01D 61/026 |

OTHER PUBLICATIONS

Office Action issued in Korean Patent Application No. 10-2020-7032547 dated Mar. 18, 2022, along with English translation thereof.
International Search Report issued in International Patent Application No. PCT/JP2019/015130, dated May 7, 2019 and English Translation thereof.
Written Opinion of the International Search Authority issued in International Patent Application No. PCT/JP2019/015130, dated May 7, 2019 and English Translation thereof.
Office Action issued in corresponding Japanese Patent Application No. 2018-117270 dated Nov. 29, 2022, along with English translation thereof.
Office Action issued in corresponding Japanese Patent Application No. 2018-117270 dated Aug. 2, 2022, along with English translation thereof.
Wang, "Green electro-deionized water treatment technique" p. 54, China Environmental Science Press, Dec. 2010 (Discussed in Chinese Office Action, translation, p. 10).
Office Action issued in corresponding Chinese Patent Application No. 201980019974.5 dated Aug. 4, 2022, along with English translation thereof.
Office Action issued in corresponding Chinese Patent Application No. 201980019974.5 dated Dec. 5, 2022, along with machine English translation thereof.
Office Action issued in corresponding Taiwanese Patent Application No. 108117017 dated Nov. 30, 2022, along with English translation thereof.

* cited by examiner

METHOD OF REMOVING BORON FROM WATER TO BE TREATED, BORON-REMOVING SYSTEM, ULTRAPURE WATER PRODUCTION SYSTEM, AND METHOD OF MEASURING CONCENTRATION OF BORON

FIELD OF THE INVENTION

The present invention relates to a method of removing boron from water to be treated, a boron-removing system, an ultrapure water production system, and a method of measuring a concentration of boron.

BACKGROUND OF THE INVENTION

Highly purified pure water is used for, for instance, producing pharmaceutical products and manufacturing semiconductor devices. Examples of raw water (water to be treated) used to produce pure water include clean water, well water, river water and industrial water, as well as industrial wastewater such as washing wastewater and scrubber drain water discharged from factories during different processing steps or treated water produced by making desalinated water from seawater by a reverse osmosis process or evaporation process using the seawater.

This raw water is subjected to a system for pretreatment in which adsorptive removal, filtration, and so on are combined. Next, a primary pure water system, in which reverse osmosis membrane treatment, degassing treatment, ion exchange treatment and so on are combined, is used to remove ion components and total organic carbon (TOC). In this way, primary pure water is produced. The resulting primary pure water is then optionally subjected to a secondary pure water system (subsystem), in which ultraviolet oxidation treatment, ultrafiltration treatment and so on are combined, to further increase purity and produce highly purified water for use.

The above primary pure water system can remove most of the ion components and TOC. However, it is difficult to sufficiently remove boron, which behaves as a non-dissociated substance in water, by reverse osmosis membrane or ion exchange treatment. As increasing need for high pure water purification has been felt in recent years, demand regarding reduction of boron concentration has risen.

It is known that the efficiency of boron removal using a reverse osmosis membrane (RO membrane) can be increased by regulating the water pH to alkaline side. This is because boron forms borate ions ($B(OH)_4^-$) in alkaline water. Patent Literature 1, for instance, describes a technology that removes multivalent cations in water being treated so as to adjust the pH to 9 or higher and boron is then removed using a reverse osmosis membrane.

CITATION LIST

Patent Literatures

Patent Literature 1: JP-A-9-290275 ("JP-A" means an unexamined published Japanese patent application)

SUMMARY OF THE INVENTION

Technical Problem

During pure water and/or ultrapure water production, boron concentration in the permeated water may vary due to increase/decrease of boron concentration in the water to be treated and/or ageing of the RO membrane. In order to increase the efficiency of boron removal by RO membrane treatment under such circumstances, pH of the water to be treated is shifted to alkaline side by adding a pH modifier (typically an alkali agent) to the water to be treated. The amount of the pH modifier required to be added may change with concentration of boron in water having permeated through the RO membrane. Namely, if the concentration of boron in the permeated water is higher than the targeted concentration, a larger amount of the pH modifier must be added so as to increase boron removal efficiency. On the other hand, if the concentration of boron in the permeated water is sufficiently low, boron concentration can be lowered to desired level even if the amount of pH modifier added is small. Therefore, if concentration of boron in RO membrane-permeated water can be measured, the measured value can be used to adjust the added amount of the pH modifier. Specifically, if the measured value is high, amount of added pH modifier is increased, and if the measured value is low, amount of added pH modifier is decreased. As this approach economizes pH monitor consumption, operation cost can be minimized.

In addition, importance of controlling boron concentration of RO membrane-permeated water is increasing from the viewpoint of managing operation of pure water and ultrapure water production systems that require boron concentration to be lowered.

Since the online boron monitor commonly used as means for measuring boron measures electrical conductivity as an indicator, it is prevented by high noise (high background signal level) from accurately measuring boron concentration at ppb levels unless the specific resistance of fed water is 15 MΩ·cm or higher. When inductively coupled plasma (ICP) emission spectrometry is used to measure boron at a low concentration level, the measurement similarly needs to be conducted with the specific resistance of the measured water sufficiently increased. However, the specific resistance of permeated water having passed through an ordinary RO membrane is about 1 MΩ·cm. Accordingly, management of pure water production requiring high-sensitivity measurement of boron concentration of RO membrane-permeated water is also difficult to achieve using inductively coupled plasma (ICP) emission spectrometry.

Against this backdrop, the present invention contemplates providing a method of removing boron from water to be treated that in removing impurity components by subjecting water to be treated to RO membrane treatment, measures concentration of boron in RO membrane-permeated water with high sensitivity and controls RO membrane treatment of water to be treated based on the measured value, whereby boron concentration of RO membrane-permeated water can be controlled to desired low level, stably, efficiently and at low operation cost. In addition, the present invention contemplates providing a boron-removing system suitable for implementing this method. Further, the present invention contemplates providing an ultrapure water production system incorporating the boron-removing system. Furthermore, the present invention contemplates providing a method of measuring a concentration of boron that enables enhanced accuracy measurement of boron concentration at ppb levels using a generally utilized online boron monitor or the like as an instrument for measuring boron concentration of water to be treated.

Solution to Problem

The present inventors conducted intensive research with consideration to the above problems. As a result, the present inventors found that when permeated water obtained after water to be treated is subjected to RO membrane treatment is treated using a cation remover, the specific resistance of the permeated water can be sufficiently increased. As a result, they found that boron in the permeated water can be detected with high sensitivity, thereby making it possible to supply pure water usable in semiconductor device production, pharmaceutical production and other fields with high pure water boron removal requirements, stably, efficiently and at low operation cost.

The research has been further continued based on the above findings, and the present invention has been completed.

That is, the above-described problems were solved by the following means.

[1]

A method of removing boron from water to be treated, containing the steps of:

subjecting the water to be treated to reverse osmosis membrane treatment;

subjecting at least part of permeated water after the reverse osmosis membrane treatment to cation-removing treatment; and measuring a concentration of boron in the resulting permeated water after the cation-removing treatment, wherein a measured value for the concentration of boron is used to regulate at least one of the following (a) to (e):

(a) the recovery rate of water to be treated in the above reverse osmosis membrane treatment;

(b) the temperature of the water to be treated;

(c) the pH of the water to be treated;

(d) the supply pressure of the water to be treated, which pressure is applied to the reverse osmosis membrane during the reverse osmosis membrane treatment; and (e) when the reverse osmosis membrane used for the reverse osmosis membrane treatment should be changed.

[2]

The method of removing boron from water to be treated described in the above item [1], wherein the pH of the water to be treated by the reverse osmosis membrane treatment is regulated to 9 or higher.

[3]

The method of removing boron from water to be treated described in the above item [1] or [2],
wherein the reverse osmosis membrane treatment is treatment using multiple reverse osmosis membrane devices; and
wherein the pH of the water to be supplied to and treated in at least one of the reverse osmosis membrane devices is regulated to 9 or higher.

[4]

The method of removing boron from water to be treated described in the above item [3], wherein the at least one of the multiple reverse osmosis membrane devices is a high-pressure reverse osmosis membrane device.

[5]

The method of removing boron from water to be treated described in the above item [3] or [4], wherein the flux per effective pressure of 1 MPa through the primary reverse osmosis membrane device constituting the multiple reverse osmosis membrane devices is larger than that of the secondary reverse osmosis membrane device.

[6]

The method of removing boron from water to be treated described in any one of the above items [1] to [5], containing a step of subjecting, before subjecting the water to be treated to the reverse osmosis membrane treatment, the water to be treated to cation-exchange treatment, followed by decarbonation treatment.

[7]

The method of removing boron from water to be treated described in any one of the above items [1] to [6], wherein the cation-removing treatment is conducted by using an electric regeneration-type cation remover.

[8]

A boron-removing system for removing boron from water to be treated, containing:

a reverse osmosis membrane device configured to treat water to be treated;

a cation remover configured to treat at least part of water having permeated through the reverse osmosis membrane device; and a boron analyzer configured to measure a concentration of boron in water having been treated using the cation remover, wherein the concentration of boron as measured using the boron analyzer is used to regulate at least one of the following (a) to (e):

(a) the recovery rate of water to be treated in the above reverse osmosis membrane device;

(b) the temperature of the water to be treated;

(c) the pH of the water to be treated;

(d) the supply pressure of the water to be treated, which pressure is applied to the reverse osmosis membrane in the reverse osmosis membrane device; and (e) when the reverse osmosis membrane in the reverse osmosis membrane device should be changed.

[9]

An ultrapure water production system, containing:

a pretreatment system;

a primary pure water system; and a subsystem, wherein the primary pure water system includes the boron-removing system described in the above item [8].

[10]

A method of measuring a concentration of boron in liquid, containing the steps of:

subjecting water to be treated to ion-removing treatment; and measuring a concentration of boron in water having been treated by the ion-removing treatment.

[11]

The method of measuring a concentration of boron described in the above item [10],
wherein the water to be treated is permeated water after reverse osmosis membrane treatment, and
wherein the ion-removing treatment is cation-removing treatment.

Advantageous Effects of Invention

According to the method of removing boron and the boron-removing system of the present invention, in order to remove impurity components while water to be treated is subjected to RO membrane treatment, the concentration of boron in RO membrane-permeated water should be measured with high sensitivity, and this measured value may be used to control RO membrane treatment using the water to be treated. This makes it possible to cause the concentration of boron in the RO membrane-permeated water to be decreased to a low level in a stable, efficient, and low-operation-cost manner. The ultrapure water system in the present invention also makes it possible to obtain, in a stable, efficient, and low-operation-cost manner, ultrapure water from which boron has been removed sufficiently.

According to the method of measuring the concentration of boron of the present invention, it is possible to accurately measure the concentration of boron at ppb levels, using an online boron monitor or the like which is commonly used as a device for measuring the concentration of boron in treated water.

Other and further objectives, features and advantages of the invention will appear more fully from the following description by appropriately referring to the accompanying drawings.

DESCRIPTION OF EMBODIMENTS

A boron-removing system according to a preferable embodiment (first embodiment) of the present invention will be described with reference to FIG. 1.

Figure 1:
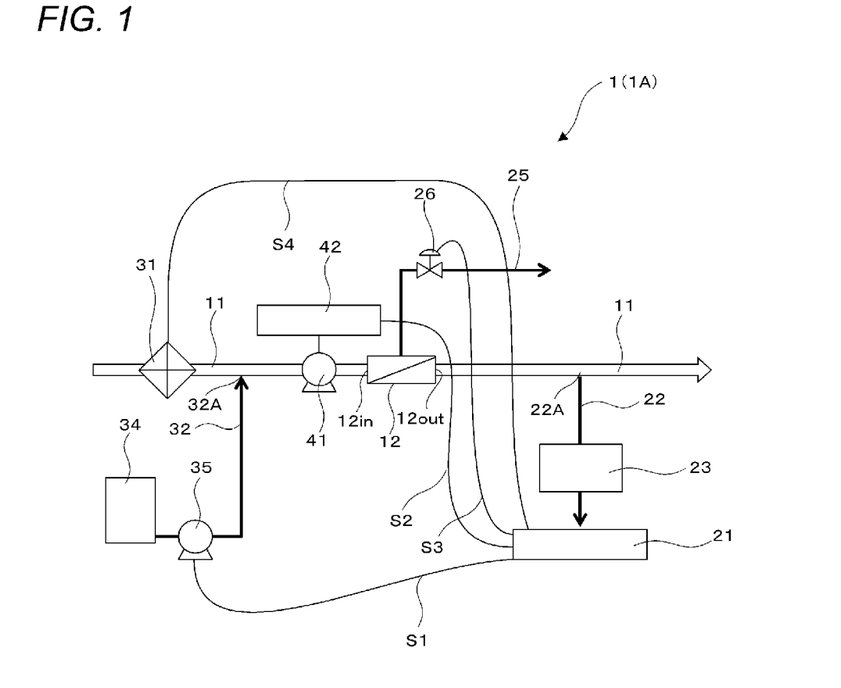
FIG. 1 is a schematic view illustrating the configuration of a boron-removing system according to a preferable embodiment (first embodiment) of the present invention.

As shown in FIG. 1, main piping 11 is deployed in a boron-removing system 1 (1A). An RO membrane device 12 configured to remove boron from water to be treated (raw water) is arranged on this main piping 11.

The main piping 11 on the inlet side 12in of the RO membrane device 12 is provided with, from a distal side relative to the RO membrane device 12, a heat exchanger 31, a merging portion 32A of a liquid-chemical pipe 32 for supplying an alkaline liquid chemical (alkali agent), and a pump 41. An end of the liquid-chemical pipe 32 is connected to an alkali agent source 34. In addition, a chemical injection pump 35 is disposed on the liquid-chemical pipe 32. This chemical injection pump 35 is used to transfer, to the main piping 11 side, an alkali agent stored in the alkali source 34.

The main piping 11 on the outlet side 12out of the RO membrane device has a branching portion 22A of a branch pipe 22 connected to a boron analyzer 21. A cation remover 23 is arranged on this branch pipe 22.

The above RO membrane device 12 is not particularly limited and may be any of an ultra-low-pressure, low-pressure, middle-pressure, or high-pressure RO membrane device. Examples of the RO membrane used for the RO membrane device include BW series manufactured by Dow Chemical Company (such as BW30HR-440 and BW30XFR-400/34i), TMG series manufactured by Toray Industries, Inc. (such as TMG20 and TMG-20D), TML series manufactured by Toray Industries, Inc. (such as TML20 and TML-20D), ES series manufactured by Nitto Denko Corporation (such as ES20-D8 and ES15-D8), LFC series manufactured by HYDRANAUTICS (such as LFC3-LD), and CPA series manufactured by HYDRANAUTICS (such as CPA5-LD).

The RO membrane device 12 has a mechanism of discharging water (concentrated water) obtained by enriching salts and/or impurities. This can be used to continuously yield permeated water while suppressing an undue increase in salt concentration on the pressurized side and suppressing generation of immiscible substances (e.g., scales) on the membrane surface. The concentrated water is drained through a concentrated water pipe 25 connected to the RO membrane device 12. It is preferable to provide the concentrated water pipe 25 with a pressure-regulating valve 26. The pressure-regulating valve 26 can be used to adjust the pressure in the concentrated water pipe 25. Accordingly, the volume of water permeated through the RO membrane 12 and the volume of concentrated water can be controlled.

The above heat exchanger 31 is used to adjust the temperature of water flowing through the main piping 11. Water vapor for heating or water for cooling can be made to flow on the secondary side of the heat exchanger.

The above pump 41 used may be a common pressurizing pump configured to pressurize and transfer water to be treated. The pressurizing pump preferably includes a pump inverter 42. The pump inverter 42 controls the rotation speed of a driving motor (not shown) in the pressurizing pump and changes the rotation speed of the driving motor gradually. A gradual change (e.g., an increase) in the rotation speed of the pump can prevent a steep change (e.g., an elevation) in the water pressure. This makes it possible to prevent damage on the RO membrane device 12 due to a steep change in the water pressure. Also, an increase in the rotation speed of the driving motor can make higher the flow rate and the pressure of water to be supplied to and treated in the RO membrane device 12.

The alkali agent source 34 is a source of chemical for increasing the pH of water to be treated. This alkali agent preferably contains sodium hydroxide (NaOH: caustic soda). The alkali agent is usually an aqueous solution prepared by dissolving NaOH. The concentration of NaOH in the NaOH aqueous solution is set, if appropriate, to be within a range such that a pH of interest is adjustable. Examples of the alkali agent that can be used include, in addition to the NaOH aqueous solution, a potassium hydroxide (KOH) aqueous solution.

The chemical injection pump 35 is to pressurize and transfer an alkali agent to the main piping 11 from the alkali agent source 34. It is possible to use, for instance, a continuous flow pump. Specifically, the chemical injection pump 35 is operated such that a designated injection volume is sent to the main piping 11. In the chemical injection pump 35, the stroke or the rotation speed of the pump may be controlled to change the injection volume. Accordingly, it is preferable that an outlet of the chemical injection pump 35 is positioned near the main piping 11.

Note that although not depicted, a control valve (not shown) may be provided, partway through the liquid-chemical pipe 32, between the chemical injection pump 35 and the main piping 11. In response to the degree of opening/closing of this control valve, the injection volume of the alkali agent may be changed.

The cation remover 23 can be used to remove cations (e.g., $Na^+$, $Ca^{2+}$, $Mg^{2+}$, $NH_4^+$, $K^+$) from water to be treated. Specific examples of the cation remover 23 include a cation exchanger packed with a cation exchange resin (preferably a strongly acidic cation exchange resin). The cation remover 23 may be used to remove cations, thereby capable of sufficiently increasing the specific resistance of permeated water. This is because anionic components among ion components present in the permeated water are marginal and cationic components are abundant. Specifically, the surface of a commonly used polyamide-based RO membrane or cellulose acetate-based RO membrane has a minus charge. The anionic components are unlikely to pass through the RO membrane because of electrostatic repulsion. By contrast, the cationic components are likely to permeate through the RO membrane. Thus, just removal of the cationic components from water having permeated through the RO membrane device can cause the specific resistance of the permeated water to increase to a level required to measure boron with high sensitivity as described below.

The boron analyzer 21 is an instrument for measuring the concentration of boron in permeated water having passed through the RO membrane device 12. This boron analyzer 21 is preferably a real-time, online-measurable meter. Examples of the boron analyzer 21 include Sievers online boron meter, manufactured by GE Company. In addition, although not real-time measurable one, it is possible to use an ICP emission spectrometry instrument.

In the above boron-removing system 1A, water to be treated is pressurized and transferred through the main piping 11 to the RO membrane device 12 by the pump 41. The RO membrane device 12 is used to remove boron from the water to be treated. The permeated water, in which boron has been removed while the water has been made to permeate through the RO membrane device 12, is transferred via the main piping 11 to the next step. Part of the permeated water is branched off into the branch pipe 22 and then fed to the cation remover 23. This cation remover 23 can be used to remove cations from the permeated water. Just removal of cations from the permeated water makes it possible to increase the specific resistance of the permeated water to, for instance, 15 MΩ·cm or higher. As such, after the specific resistance of the permeated water is increased, the resulting permeated water is fed to the boron analyzer 21. This allows for accurate measurement even if the concentration of boron is at a very low level. Some boron analyzers make it possible to detect the boron concentration at, for instance, ppt levels.

In the boron-removing system of the present invention, measured values (states in which the concentration of boron fluctuates) as determined using the boron analyzer 21 are used to regulate at least one of the following (a) to (e). This allows for more efficient boron removal.
(a) The recovery rate of water to be treated in the above reverse osmosis membrane
(b) The temperature of the water to be treated
(c) The pH of the water to be treated
(d) The supply pressure of the water to be treated, which pressure is applied to the reverse osmosis membrane during the reverse osmosis membrane treatment
(e) When the reverse osmosis membrane used for the reverse osmosis membrane treatment should be changed.

Usually, a reference value is set to each measured value for the concentration of boron; a deviation from the reference value is calculated; and the calculation results are used to regulate at least one of the above (a) to (e).

The above (a) to (e) will be described in more detail.
<(a) Recovery Rate of Water to be Treated Using Reverse Osmosis Membrane>

The recovery rate of water to be treated (flow volume %)=the volume of permeated water (flow volume)/the volume of the water to be treated (flow volume). Hereinbelow, the "%" designated in the recovery rate represents the "flow volume (%)". The concentration of boron in water having permeated through the RO membrane device 12 may be higher than a preset value. In this case, it is possible to decrease the proportion (the recovery rate of water to be treated) of the volume of permeated water having passed through the RO membrane device 12 with respect to the volume (flow volume) of the water to be supplied to and treated in the RO membrane device 12, thereby decreasing the concentration of boron in the permeated water. The concentration of boron in water having permeated through the RO membrane device 12 may be much lower than the preset value. In this case, it is possible to elevate the recovery rate of the water to be treated in the RO membrane device 12, thereby making the operation more efficient.

The recovery rate may be controlled by adjusting the output of the pump inverter 42, adjusting the degree of opening of the pressure-regulating valve 26, or implementing both. For instance, the pump inverter 42 may be used to control the output of the pump 41, thereby regulating the flow volume of the RO permeated water and RO concentrated water. In this way, the recovery rate is adjustable. In addition, the degree of opening of the pressure-regulating valve 26 may be enlarged using a signal line S3 to increase the volume of concentrated water and thus lower the recovery rate. In this case, the concentration of boron on the pressurized side of the RO membrane device 12 can be lowered. Accordingly, the concentration of boron on the post-permeation side can also be lowered.

Figure 2:
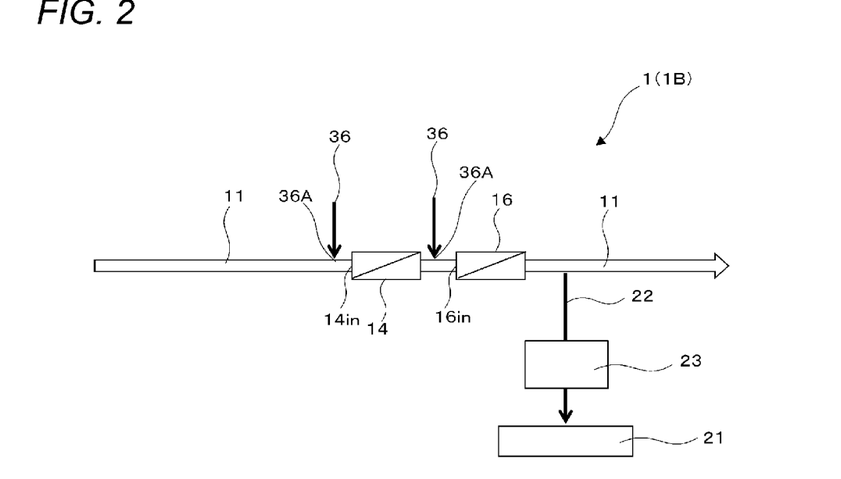
FIG. 2 is a schematic view illustrating the configuration of a boron-removing system according to a preferable embodiment (second embodiment) of the present invention.

In the case where the RO membrane device has one-pass configuration, the recovery rate of water to be treated is calculated from the ratio of the volume of permeated water discharged from the RO membrane device 12 to the volume of the water to enter the RO membrane device 12 and be treated. In addition, in the case where the RO membrane has multiple-pass configuration (e.g., the below-described first and second RO membranes 14 and 16), each recovery rate from the RO membrane is calculated from the respective volumes of permeated water and volumes of water to be supplied to and treated in the first and second RO membranes 14 and 16. As used herein, water to be treated with the second RO membrane 16 means the same as water having permeated through the first RO membrane 14.
<(b) Temperature of Water to be Treated>

When the concentration of boron in water having permeated through the RO membrane device 12 is higher than a preset value, the temperature of water to be treated may be decreased. In this case, it is possible to increase the rate (filtering-out rate) of removing boron by using the RO membrane device 12. Accordingly, the concentration of boron in the permeated water can be lowered. For instance, a signal line S4 is used to regulate the heat exchanger 31, and as a result of which the water to be treated may be cooled. This can lower the concentration of boron in the permeated water having passed through the RO membrane device 12.
<(c) pH of Water to be Treated>

The concentration of boron in water having permeated through the RO membrane device 12 may be higher than a preset value. In this case, it is possible to making higher the pH of the water to be treated so as to increase the rate of filtering out boron by using the RO membrane device 12. Specifically, to increase the pH of water to be treated, an alkali agent may be injected into the water to be treated. This makes it possible to lower the concentration of boron in water having permeated through the RO membrane device 12. For instance, the amount of alkali agent to be injected is determined in response to a change in the concentration of boron. Then, a signal line S1 can be used to continuously operate the chemical injection pump 35 in response to the determined amount of alkali agent.

For instance, the concentration of boron in water having permeated through the RO membrane device 12 may be higher than a preset value. In this case, the chemical injection pump 35 should be operated so as to set the pH of the water to be treated to, for instance, 9.0 or higher. Then, an alkali agent (e.g., a NaOH aqueous solution) is injected from the alkali agent source 34 into the main piping 11, namely, water to be treated. In addition, the concentration of boron in water having permeated through the RO membrane device 12 may be much lower than the preset value. In this case, the amount of alkali agent to be injected may be decreased, so that use of excessive alkali agent may be avoided. Note that the upper limit of the pH of the water to be treated is preferably 12 or lower and more preferably 11 or lower from the viewpoint of chemical resistance of RO membrane.

<(d) Supply Pressure of Water to be Treated, which Pressure is Applied to Reverse Osmosis Membrane>

The concentration of boron in water having permeated through the RO membrane device 12 may be higher than a preset value. In this case, the supply pressure of water to be treated, which pressure is applied to the RO membrane device 12, is increased, thereby capable of lowering the concentration of boron in water having permeated through the RO membrane device 12. Specifically, the pump inverter 42, which serves as a flow rate controller, is used to actuate the pump 41 such that the supply pressure of the water to be treated, which pressure is applied to the RO membrane device 12, is made higher. At that time, a signal line S2 is used to regulate the output (e.g., the rotation speed) of the pump-driving electric motor by the pump inverter 42 such that a rapid pressure change does not occur. In this way, the flow volume of the water to be treated may be made larger to increase the water pressure. Further, a signal line S3 is used to adjust and make smaller the degree of opening of the pressure-regulating valve 26. This causes an increase in the pressure because a back pressure is imposed on the RO membrane 12. Such a means may be used to increase the pressure. This can lower the concentration of boron in permeated water having passed through the RO membrane device 12. In addition, the concentration of boron in water having permeated through the RO membrane device 12 may be much lower than the preset value. In this case, the supply pressure of the water to be treated may be decreased to increase the concentration of boron in water having permeated through the RO membrane device 12.

Note that regulation of the supply pressure of the water to be treated may cause a change in (a) the recovery rate. As used herein, the operation, which aims at regulating this supply pressure, corresponds to the regulation of (d), but not the above-described regulation of (a).

<(e) When Reverse Osmosis Membrane should be Changed>

The RO membrane may be deteriorated overtime as the use continues, subjected to oxidation deterioration due to contact with an oxidizer, and subjected to hydrolysis occurring due to an alkaline atmosphere. These may cause a decrease in the boron filtering-out rate. The concentration of boron in water having permeated through the RO membrane device 12 may be higher than a preset value. This case may be caused by deterioration of the RO membrane device 12. In such a case, the RO membrane device may be replaced by a new one to lower the concentration of boron in water having permeated through the RO membrane device 12.

Next, a method of removing boron according to an embodiment will be described below by referring to the boron-removing system 1A illustrated in FIG. 1.

As shown in FIG. 1, water to be treated is introduced via the main piping 11 into the RO membrane device 12. Various kinds of components and boron in the water to be treated are removed by the RO membrane device 12.

At least part of permeated water having passed through the RO membrane device 12 is branched off into the branch pipe 22. Then, cations are removed by the cation remover 23. Subsequently, the boron analyzer 21 is used to measure the concentration of boron in the permeated water from which cations have been removed.

After that, based on the concentration of boron as measured by the boron analyzer 21, the above (a) to (e) are regulated. These regulations can also be performed by a controller (not shown), such as a computer, which is separately provided in addition to the boron analyzer 21.

In the above boron-removing system 1A, the pH, at the inlet side 12in of the RO membrane device 12, of water to be treated is preferably set to an alkaline side. More preferably, the pH is regulated to 9 or higher. Such a regulation of the pH of water to be treated makes it possible to increase the rate of filtering out boron by the RO membrane 12. When the concentration of boron in permeated water is high, a more amount of alkali agent may be added to increase the pH. In this case, it is possible to increase the rate of removing boron by using the RO membrane device. By contrast, the concentration of boron in the permeated water may be sufficiently low. In this case, even if the amount of alkali agent to be added to the water to be treated is small, the boron removal of interest can be implemented. That is, it is possible to avoid excessive use of the alkali agent, thereby reducing the operation cost.

The above cation remover is not particularly limited as long as the cation remover has a cation exchange function. For instance, an electric regeneration-type cation remover can be preferably used.

It is preferable that an ion exchanger used in the electric regeneration-type cation remover is a porous ion exchanger having a continuous pore structure in which walls between macropores connected to one another contain mesopores with an average diameter of from 1 to 1000 μm and preferably from 10 to 100 μm. Also, it is preferable that the total pore volume is from 1 to 50 mL/g and preferably from 4 to 20 mL/g; ion exchange groups are evenly distributed; and the ion exchange capacity is more than or equal to 0.5 mg equivalent/g of dried porous body. For instance, JP-A-2003-334560 discloses other physical properties of the porous ion exchanger and how to produce it.

Use of the porous ion exchanger as a cation exchanger enables the pore volume and the specific surface area to be enlarged markedly. This causes a marked increase in the ion removal efficiency of the electric regeneration-type cation remover, which is very advantageous. In addition, the porous ion exchanger may have a total pore volume of less than 1 mL/g. In this case, the volume of water passing through a unit cross sectional area becomes small and the treatment capacity may thus be decreased. This is not preferable. Meanwhile, the total pore volume may exceed 50 mL/g. In this case, the percentage of the main skeleton decreases and the strength of the porous body is markedly lowered. This is not preferable. A porous ion exchanger having a total pore volume of from 1 to 50 mL/g may be used as an ion exchanger for the electric regeneration-type cation remover. This case is preferable because both the strength and the ion removal efficiency of the porous body can be met. In addition, the porous ion exchanger may have an ion exchange capacity of less than 0.5 mg equivalent/g of porous body. This case is not preferable because the ion adsorption capacity is insufficient. In addition, ion exchange groups may be distributed unevenly. This case is not preferable because ion migration inside the porous cation exchanger is ununiform and rapid elimination of ions adsorbed is prevented.

Examples of a fibrous and porous ion exchanger include: a woven or nonwoven fabric made of a single fiber or an assembly of single fibers as described in JP-A-5-64726; or a molding processed by introducing ion exchange groups into a processed product of the above by utilizing radiation graft polymerization. In addition, examples of an aggregated particle-type porous ion exchanger include a molding processed by linking ion exchange resin particles by using a mixed polymer of a thermoplastic polymer and a thermosetting polymer or a crosslinking polymer as described in JP-A-10-192716 or JP-A-10-192717.

The above electric regeneration-type cation remover may be employed as the cation remover 23. This makes it possible to continuously remove cations because the regeneration step using a liquid chemical needed for common ion exchangers can be omitted. The average diameter of the porous ion exchanger may be determined by a mercury press-in method. In addition, the total pore volume of the porous ion exchanger may be measured using a pore distribution tester: AutoPoreIII9420, manufactured by Micromeritics Instrument Corp.

It is preferable to use a high-pressure RO membrane device as the RO membrane device 12. The high-pressure RO membrane device has originally been developed for making desalinated water from seawater. Here, a lower operating pressure may be used to efficiently remove, for instance, ions and TOC from raw water with a low salt concentration. In the case of the high-pressure RO membrane device, it is possible to achieve, just by using one device, the filtering-out capacity of two low-pressure RO membrane devices. It is also possible to use a multi-pass RO membrane device in which a low-pressure RO membrane device and a high-pressure RO membrane device are combined or a multi-pass RO membrane device using high-pressure RO membrane devices. Use of such an RO membrane device allows for a big increase in the rate of removing non-dissociated substances such as boron, silica, urea, ethanol, and isopropyl. Examples of the RO membrane device include SWC series manufactured by HYDRANAUTICS (such as SWC4, SWC5 and SWC6), TM800 series manufactured by Toray Industries, Inc. (such as TM820V and TM820M), and SW series manufactured by Dow Chemical Company (such as SW30HRLE and SW30ULE).

From the viewpoint of reducing pure water production cost, the recovery rate of water to be treated in the RO membrane device 12 is preferably 80% or higher, more preferably 85% or higher, and further preferably 90% or higher. When the recovery rate is set to "80% or higher", it has an advantage of obtaining a larger volume of permeated water with respect to the water to be treated.

Next, a boron-removing system according to a preferable embodiment (second embodiment) of the present invention will be described with reference to FIG. 2.

A boron-removing system 1 (1B), as illustrated in FIG. 2, is formed by linearly deploying, on the main piping 11, a first RO membrane device 14 and a second RO membrane device 16 instead of the RO membrane device 12 in the above boron-removing system 1A. Further, it is preferable that the merging portion 36A of the liquid-chemical pipe 36 is disposed on the main piping 11 near any of the inlet side 14in of the first RO membrane device 14 or the inlet side 16in of the second RO membrane device 16. The other configurations are the same as in the boron-removing system 1A. Note that in FIG. 2, only the main parts including the main piping 11, the first RO membrane device 14, the second RO membrane device 16, the boron analyzer 21, the branch pipe 22, and the cation remover 23 are depicted. The other parts are not depicted. The other parts are the same as described in FIG. 1.

In a method of removing boron by using the above boron-removing system 1B, water to be treated is made to continuously pass through two RO membrane devices (the first RO membrane device 14 and the second RO membrane device 16). This makes it possible to further increase the efficiency of removing impurity components including boron. In addition, in the case where the inlet side 14in of the first RO membrane device 14 has the merging portion 36A of the liquid-chemical pipe 36, an alkali agent can be supplied to water to be supplied to and treated in the first RO membrane device 14. This can increase the pH (preferably increase the pH to 9 or higher) of the water to be treated. In this case, the boron-removing capacity of the first RO membrane device 14 is enhanced. Meanwhile, in the case where the inlet side 16in of the second RO membrane device 16 has the merging portion 36A of the liquid-chemical pipe 36, the pH of water to be treated in the second RO membrane device 16 can be increased (the pH is increased to 9 or higher). In this case, the boron-removing capacity of the second RO membrane device 16 is enhanced. Note that concentrated water drained from the second RO membrane device 16 is optionally mixed, at the upstream of a pump (not shown) configured to send water to be treated to the first RO membrane 12, with the water to be treated in the first RO membrane device 14. The water to be treated in the second RO membrane device 16 has been treated in the first RO membrane device 14. Thus, the concentrated water of interest has a better water quality than the water having been treated in the first RO membrane device 14. In such a case, the concentrated water from the second RO membrane device 16 may be mixed with the water to be treated in the first RO membrane device 14. Accordingly, a dilution effect can be exerted on the water to be treated in the first RO membrane device 14, thereby capable of lowering the concentration of boron supplied to the first RO membrane device 12.

In the embodiment in FIG. 2, at least one of the above multiple RO membrane devices (e.g., the first RO membrane device 14, the second RO membrane device 16) is preferably a high-pressure RO membrane device. It is more preferable that at least one of the multiple RO membrane devices is controlled such that water to be supplied to and treated in the reverse osmosis membrane device has a pH of 9 or higher. Here, the reverse osmosis membrane device is preferably a high-pressure reverse osmosis membrane device.

It is preferable that the flux per effective pressure of 1 MPa through the primary first RO membrane device 14 of the RO membrane device is larger than that of the secondary second RO membrane device 16. The flux is obtained by dividing the volume of permeated water by the area of the RO membrane. The "effective pressure", described in "Membrane Terms" in JIS K3802:2015, is an effective pressure acting on a membrane as obtained by subtracting an osmotic pressure difference and a secondary side pressure from an average operating pressure. Note that the average operating pressure is obtained by averaging the pressure (operating pressure) of water supplied to the primary side membrane of the RO membrane and the pressure of concentrated water (the pressure at the outlet of concentrated water), and is expressed by the following equation:

Average operating pressure=(Operating pressure+
Pressure at the outlet of concentrated water)/2.

The flux per effective pressure of 1 MPa may be calculated from information listed in a catalog of the manufacturer of the membrane, such as the volume of permeated water, the area of membrane, the recovery rate at the time of evaluation, and the concentration of NaCl. In addition, one or more pressure vessels may be loaded with a plurality of RO membranes having the same flux. In this case, the flux of the membrane loaded can be calculated from information on, for instance, the average operating pressure/secondary side pressure of each pressure vessel, raw water qualities, the volume of permeated water, and the number of membranes. Specifically, from the viewpoint of qualities of permeated water obtained, the difference between the flux per effective pressure of 1 MPa through the RO membrane of the first RO membrane device 14 and the flux per effective pressure of 1 MPa through the RO membrane of the second RO membrane device 16 is preferably 0.3 m³/(m²·d) or higher, more preferably 0.5 m³/(m²·d) or higher, and further preferably 0.7 m³/(m²·d) or higher. Then, from the viewpoint of driving power of a pump for the second RO membrane device 16, the difference is preferably 1 m³/(m²·d) or less.

The above RO membrane has two-pass configuration, but may have a multi-pass configuration. In this case, the multiple RO membrane devices are preferably deployed in series. It is preferable that at least one of the multiple RO membrane devices is a high-pressure RO membrane device. In addition, it is preferable to increase the pH (preferably set the pH to 9 or higher) of water to be introduced into and treated using at least one RO membrane device.

Next, a boron-removing system according to a preferable embodiment (third embodiment) of the present invention will be described with reference to FIG. 3.

Figure 3:
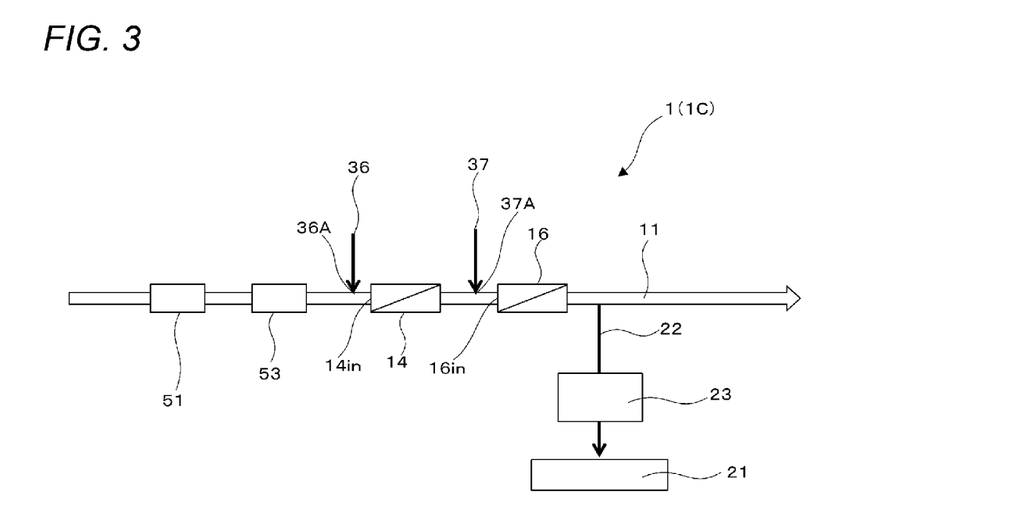
FIG. 3 is a schematic view illustrating the configuration of a boron-removing system according to a preferable embodiment (third embodiment) of the present invention.

In a boron-removing system 1 (1C), as illustrated in FIG. 3, pretreatment is carried out before the boron-removing treatment using the RO membrane device in the above-described boron-removing system 1B. The pretreatment is preferably carried out by cation-exchange treatment using a cation exchanger 51 filled with a cation exchange resin, followed by decarbonation treatment using a decarbonation unit 53. Specifically, the main piping 11 upstream of the first RO membrane 14 is preferably provided with, in sequence from the distal side of the first RO membrane 14, the cation exchanger 51 and the decarbonation unit 53 as a pretreatment system. These units are preferably disposed upstream of the heat exchange device 31 shown in FIG. 1. Note that "upstream" means the upstream side of flow of permeated water or water to be treated relative to a target position of the main piping 11.

It is preferable to use a strongly acidic cation exchange resin during the cation-exchange treatment in the cation exchanger 51. H of a strongly acidic cation R—SO₃.H (where R designates a base body of the ion exchange resin) replaces and removes, for instance, Na⁺, Ca²⁺, or Mg²⁺ from water. During treatment with the cation exchanger 51, H⁺ is dissociated from the ion exchange resin, and as a result of which the water to be treated becomes acidic. This water to be treated is transferred to the decarbonation unit 53.

Note that it is possible to use, as this cation exchange resin, a Na-type resin, namely R—SO₃.Na. In this case, the pH does not change between before and after the treatment with the ion exchange resin. However, the pH can be lowered by adding an acid to water treated with the ion exchange resin.

The decarbonation unit 53 is configured to gasify and remove carbonate components contained in water while the resulting acidic water is subjected to gas-liquid contact. That is, $HCO_3^-$ in water is converted such that $HCO_3^- + H^+ \rightarrow H_2CO_3$. Air is blown thereinto, and a reaction of $H_2CO_3 \rightarrow H_2O + CO_2$ then occurs. Most of the resulting $CO_2$ (carbon dioxide) is released from the water to be treated into the air. Accordingly, the water to be treated with the cation exchanger 51 is sent to the decarbonation unit 53. Then, air is injected by the decarbonation unit 53 to be able to remove carbonate components.

Additionally, it is preferable that the merging portion 36A of the liquid-chemical pipe 36 for supplying an alkali agent that regulates the pH of water to be treated is disposed on the main piping 11 near the inlet side 14in of the first RO membrane device 14 or the inlet side 16in of the second RO membrane device 16. This liquid-chemical pipe 36 is substantially the same as the liquid-chemical pipe 32 described in FIG. 1.

Further, the main piping 11 between the first RO membrane device 14 and the second RO membrane device 16 may have a merging portion 37A of an acidic liquid-chemical pipe 37 for supplying an acidic liquid chemical that regulates the pH of the water to be treated. Then, an acid may be added to water to be treated in the second RO membrane device 16 such that the pH of the water to be treated is adjusted to a neutral pH of about 7 to 8. The resulting alkaline water to be treated in the second RO membrane device 16 can be so adjusted to a neutral or near neutral pH. Thus, the efficiency of removing cations by the second RO membrane device 16 can be increased. As a result, the number of cations to be removed by the cation remover 23 is decreased. This can reduce the strength of regeneration in the cation remover 23. For instance, the cation remover 23 may be of an electric regeneration type. In this case, it is possible to decrease the voltage required for regeneration. Examples of the acidic liquid chemical include sulfuric acid ($H_2SO_4$), hydrochloric acid (HCl), and nitric acid ($NHO_3$). The concentration of the acidic liquid chemical is set, if appropriate. The other configurations are the same as in the boron-removing system 1B. Note that in FIG. 3, only the main parts including the main piping 11, the first RO membrane device 14, the second RO membrane device 16, the boron analyzer 21, the branch pipe 22, the cation remover 23, the cation exchanger 51, and the decarbonation unit 53 are depicted. The other parts are not depicted. The other parts are the same as described in FIG. 1.

In a method of removing boron in the above boron-removing system 1C, the cation exchanger 51 may be used to remove cations such as Na⁺, Ca²⁺, and Mg²⁺ from water to be treated. Further, the decarbonation unit 53 may be used to decompose and remove carbonic acid occurring in the acidic liquid from the water to be treated. This makes approximately neutral the pH of the water to be treated. Furthermore, the liquid-chemical pipe 36 is used to supply an alkali agent (a NaOH aqueous solution) to the main piping 11. This causes an increase in the pH of water to be treated (preferably, the pH is regulated to 9.0 or higher). The cation exchanger 51 and the decarbonation unit 53 are used to remove carbonic acid and hardness components such as Ca²⁺ and Mg²⁺. Accordingly, even if the pH is adjusted to an alkaline side, difficult-to-separate substances (scales) are hardly generated. Then, boron is removed, using the first RO membrane device 14, from this water to be treated. Permeated water having passed through the first RO membrane device 14 may be provided optionally with an alkaline liquid chemical or an acidic liquid chemical so as to adjust the pH of the permeated water. After that, like in the first embodiment, the concentration of boron in water having permeated through the second RO membrane device 16 is measured. Based on the measured values, the RO membrane is controlled.

Next, a boron-removing system according to a preferable embodiment (fourth embodiment) of the present invention will be described with reference to FIG. 4.

Figure 4:
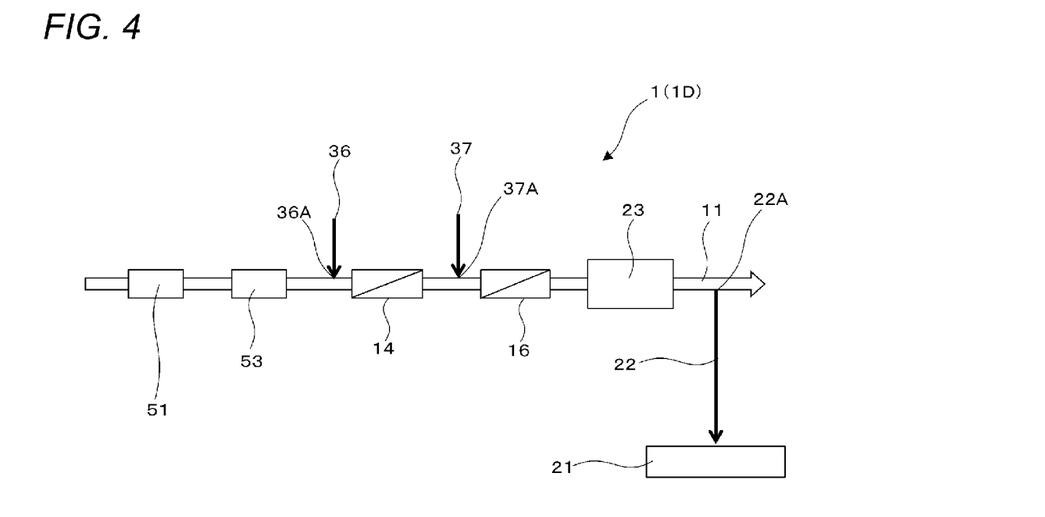
FIG. 4 is a schematic view illustrating the configuration of a boron-removing system according to a preferable embodiment (fourth embodiment) of the present invention.

In a boron-removing system 1 (1D), as illustrated in FIG. 4, the cation remover 23 is deployed on the main piping 11 between the second RO membrane device 16 and the branching portion 22A of the branch pipe 22 in the above-described boron-removing system 1C. The other parts are the same as in the above-described boron-removing system 10.

Because the whole volume of permeated water is made to pass through the cation remover 23 in the above boron-removing system 1D, cations in the permeated water can be removed. Hence, this boron-removing system 1D can be used in a primary pure water system for producing ultrapure water.

Hereinafter, an ultrapure water production system having a boron-removing system according to a preferable embodiment of the present invention will be described with reference to FIG. 5.

Figure 5:
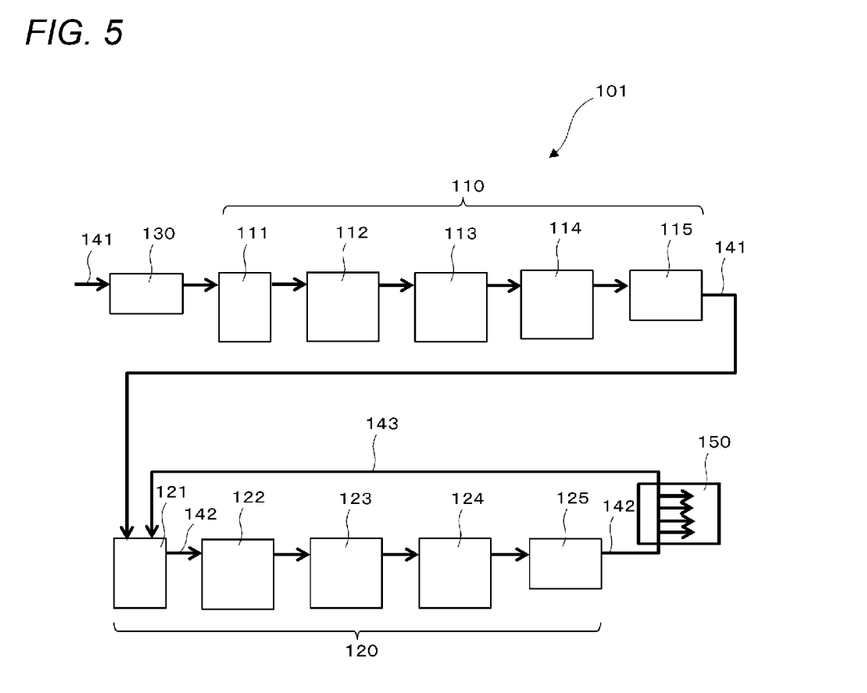
FIG. 5 is a schematic view illustrating the configuration of, as a preferable example, an ultrapure water production system to which a boron-removing system of the present invention is applicable.

An ultrapure water production system 101, as illustrated in FIG. 5, includes a primary pure water system 110 and a secondary pure water system (subsystem) 120. In addition, it is preferable that a pretreatment system 130 is deployed upstream of the primary pure water system 110. In this pretreatment system 130, flocculation, filtration, membrane separation, and so on are used to remove microparticles (e.g., suspended substances, colloidal substances) contained in water to be treated (raw water). Specific examples include flocculation and sedimentation, pressure flotation, sand filtration, decontamination using MF/UF membranes, decarbonation, and/or softening.

After the primary pure water system 110, majority of ions, TOC, dissolved gas (oxygen, $CO_2$), $SiO_2$, and others can be removed. As a result, regarding the water quality in the primary pure water system 110, the specific resistance is 17.5 MΩ·cm or higher.

In the primary pure water system 110, water to be treated, which has been pretreated in the pretreatment system 130, is made to flow into a tank 111. It is preferable that the water to be treated is made to flow constantly from the tank 111 via primary main piping 141 to the downstream side. It is preferable that a heat exchanger 112, an RO membrane 113, an ion exchanger 114, and a deaerator 115 are arranged in this order and connected in series along the primary main piping 141 on the downstream side of the tank 111.

Preferable examples of the ion exchanger used include a two-bed two-tower regeneration ion exchanger, a two-bed one-tower regeneration ion exchanger, a mixed bed regeneration ion exchanger, or a regeneration ion exchanger. In the two-bed two-tower regeneration ion exchanger, a cation exchange tower filled with a strongly acidic cation exchange resin and an anion exchange tower filled with a strongly basic anion exchange resin are connected in series. In the two-bed one-tower regeneration ion exchanger, one tower includes a strongly acidic cation exchange resin and a strongly basic anion exchange resin in any selected order such that the strongly acidic cation exchange resin and the strongly basic anion exchange resin are provided as separate different layers. In the mixed bed regeneration ion exchanger, a strongly acidic cation exchange resin and a strongly basic anion exchange resin are homogeneously mixed and charged into one tower. In the regeneration ion exchanger, one or more electric regeneration ion removers are connected in series.

In addition, the primary pure water system is optionally provided with an ultraviolet oxidation unit or an ultraviolet disinfection unit. Further, they may be optimally arranged and are not limited to the above arrangement. For instance, to disinfect water having been treated and water to be treated with the RO membrane 113, an ultraviolet disinfection unit may be installed. In addition, after inorganic carbon has been removed by degassing water having permeated through the RO membrane 113, the water may be subjected to ultraviolet oxidation and ion exchange in this order. Alternatively, the RO permeated water may be directly oxidized with ultraviolet and then injected into the ion exchanger. Further, a two-bed three-tower ion exchanger may be provided upstream of the RO membrane 113. The two bed three-tower ion exchanger includes a cation exchange tower, an anion exchange tower, and a decarbonation tower. The cation exchange tower is installed in one tower such that a strongly acidic cation exchange resin and a weakly acidic cation exchange resin are provided as separate different layers. The anion exchange tower is installed in one tower such that a strongly basic anion exchange resin and a weakly basic anion exchange resin are provided as separate different layers. In the decarbonation tower, $CO_2$ is removed from water to be treated. The configuration of this primary pure water system may be optionally selected in view of properties of the water to be treated and properties of the resulting primary pure water. Regarding the water qualities of the primary pure water obtained by such treatments, the specific resistance may be 18 MΩ·cm or higher, TOC may be at 20 ppb or lower, Na may be at 1 ppb or lower, chloride ion may be at 1 ppb or lower, metals (e.g., iron, manganese, aluminum, zinc) may be at 1 ppb or lower, ionic silica may be at 10 ppb or lower, and boron may be at 0.05 ppb or lower.

It is preferable that as the RO membrane 113, an RO membrane device of the boron-removing system 1 in the present invention is assembled into this primary pure water system 110 and this boron-removing system 1 is so used.

The heat exchanger 112 used may be substantially the same one as the above-described heat exchanger 31 (see FIG. 1). The RO membrane 113 used may also be substantially the same one as the RO membrane of the above-described RO membrane device 12 (see FIG. 1).

The ion exchanger 114 can be used to preferentially remove ions, TOC, dissolved oxygen, and carbon dioxide gas. For instance, it is possible to use a mixed bed exchanger filled with a cation exchange resin and an anion exchange resin in the same tower. The cation exchange resin can be used to remove cationic components such as $Ca^{2+}$, $Mg^{2+}$, and $Na^+$. The anion exchange resin can be used to remove anionic components such as $SO_4^{2-}$ and $NO_3^-$.

The deaerator 115 uses, for instance, a gas-liquid separation membrane to efficiently and preferentially remove dissolved oxygen and carbon dioxide gas from water.

The resulting degassed pure water flows into a tank 121 of the secondary pure water system 120. In the secondary pure water system 120, a trace amount of ions and TOC, which have not been removed using the primary pure water system 110, should be removed. In addition, ions and TOC that are eluted from system parts after the primary pure water system 110 can be removed.

In the secondary pure water system 120, secondary main piping 142 is connected on the downstream side of the tank 121. It is preferable that a heat exchanger 122, an ultraviolet (UV) oxidation unit 123, an ion exchanger 124, and an UF membrane (ultrafiltration membrane) unit 125 are arranged in this order and connected in series on the secondary main piping 142. Further, a use point 150 is preferably connected to an end of the secondary main piping 142. It is preferable that ultrapure water not used at the use point 150 should be returned via a return pipe 143 to the tank 121. Accordingly, ultrapure water may be used at the use point 150 while not retained partway or may be continued to flow through a circulation system in which the water passes through from the tank 121 to the secondary main piping 142 and is returned via the return pipe 143 to the tank 121 again. Such a circulation system may be adopted to decrease the risk of contamination in ultrapure water during the course of the circulation system.

The heat exchanger 122 used may be substantially the same one as the above-described heat exchanger 31 (see FIG. 1).

The UV oxidation unit 123 may be used to remove TOC. Water may be directly irradiated with ultraviolet during treatment using the ultraviolet with a main wavelength of 185 nm. This causes a strongly oxidizing hydroxy radical (OH radical). This oxidation action can induce decomposition of low-molecular-weight organic matter into carbon dioxide gas and organic acid.

The ion exchanger 124 may be used to remove ions remaining in the secondary pure water system 120. Generally speaking, it is preferable to use an approximately several hundred-liter container, what is called a deminar, having an ion exchange resin. It is also preferable that carbon dioxide gas and organic acid generated by the UV oxidation unit 123 are usually adsorbed on and/or removed by an anion exchange resin.

The UF unit 125 is a membrane having a pore size of from 0.01 to 0.001 μm and is a functional member used for finishing treatment (microparticle removal) during ultrapure water production. The UF membrane has a small pore size and the membrane is thus occluded in a short time with microparticles and impurities filtered out. Thus, it is preferable to adopt a cross-flow system in which raw liquid is usually continuously flowed in a certain direction along the surface of a membrane; concentrated water in which microparticles and impurities are enriched is continuously drained or returned to the liquid-sending side and then used to reduce attachment of the microparticles and impurities on the membrane surface.

In each embodiment described above, the water quality of the water to be treated is not particularly limited. Examples of the water to be treated that can be preferably used include industrial water, surface water, tap water, groundwater, seawater, desalinated processed water obtained by making desalinated water from seawater by reverse osmosis or evaporation, and various types of wastewater, for instance, wastewater discharged during the semiconductor manufacturing process. The boron concentration of interest is not particularly limited and the concentration of boron is from 1 ppb to 5 ppm, preferably from 5 ppb to 1 ppm, and more preferably from 5 ppb to 100 ppb.

A method of measuring boron in the present invention is a method of measuring the concentration of boron in liquid. The method includes the steps of: subjecting the above water to be treated to ion-removing treatment, and measuring the concentration of boron in water having been treated by the ion-removing treatment. The water to be treated is preferably permeated water after reverse osmosis membrane treatment. The ion-removing treatment is preferably cation-removing treatment as described above.

In this method of measuring boron, the specific resistance is made sufficiently higher (e.g., 15 MΩ·cm or higher) by removing ions from the permeated water. This allows for the boron concentration measurement. Thus, a commonly used online boron monitor, for instance, may be used to accurately measure the concentration of boron at ppb levels. This method of measuring boron in the present invention is suitably applicable to, for instance, a method of removing boron from water to be treated according to the present invention and a boron concentration measurement in the removal system.

EXAMPLES

Example 1

In Example 1, the boron-removing system 1B shown in FIG. 2 was used and industrial water was used as water to be treated. A NaOH aqueous solution was added from the liquid-chemical pipe 36 on the inlet side of the first RO membrane device 14 to this water to be treated so as to set the pH to 10.5. The water was then made to pass through the two RO membrane devices (the first RO membrane device 14 and the second RO membrane device 16). No liquid chemical was added from the liquid-chemical pipe 36 between the first RO membrane device 14 and the second RO membrane device 16. Water having permeated through the two RO membrane devices was made to pass through the cation remover 23 (electric regeneration-type cation remover). After that, the concentration of boron was measured with the boron analyzer 21. The boron analyzer 21 used was an ICP emission spectrometry instrument (SPS3100, manufactured by SII NanoTechnology Inc.). TDS (Total Dissolved Solids) was measured in accordance with an evaporation drying test (JIS:K0102). The electrical conductivity (specific resistance) was measured using an electrical conductivity meter HE-200H, manufactured by HORIBA Advanced Techno, Co., Ltd. The concentration of Na was measured using an ion chromatography system ICS-1600, manufactured by Dionex, Inc. The first RO membrane device 14 and the second RO membrane device 16 used were each ES20-D8 (manufactured by NITTO DENKO CORPORATION, with a flux per effective pressure of 1 MPa: 1.14 m$^3$/m$^2$/d). The first RO membrane device 14 was operated at a recovery rate of 80%, and the second RO membrane device 16 was operated at a recovery rate of 90%. Although not depicted, concentrated water from the second RO membrane device 16 was merged into water to be treated in the first RO membrane device 14.

At the inlet of the first RO membrane device 14 after the alkali addition, TDS was at 150 ppm, the electrical conductivity was 340 ρS/cm (the specific resistance was 2.9 kΩ·cm), the Na concentration was 54 ppm, and the concentration of boron was 10 ppb.

Example 2

In Example 2, the boron-removing system 1C shown in FIG. 3 was used and industrial water was used as water to be treated. This water to be treated was made to pass through the cation exchanger 51 and the decarbonation unit 53. Next, an alkali was added from the liquid-chemical pipe 36. Then, the resulting water was made to pass through two high-pressure RO membrane devices (the first RO membrane device 14 and the second RO membrane device 16) in this order. No acidic liquid chemical was added from the acidic liquid-chemical pipe 37. Water having permeated through the two RO membrane devices was made to pass through the cation remover 23. After that, the concentration of boron in the permeated water was measured with the boron analyzer 21. The boron analyzer 21 used was the above-described ICP emission spectrometry instrument. The TDS, electrical conductivity (specific resistance) and Na concentration were measured in the same manner as in Example 1. The first RO membrane device 14 and the second RO membrane device 16 used were each "SWC5MAX" (manufactured by Hydranautics, with a flux per effective pressure of 1 MPa: 0.32 $m^3/m^2/d$). The other conditions were the same as in Example 1.

At the inlet of the first RO membrane device 14 after the alkali addition, pH was 10, TDS was at 140 ppm, the electrical conductivity was 320 µS/cm (the specific resistance was 3.1 kΩ·cm), the Na concentration was 45 ppm, and the concentration of boron was 10 ppb.

Comparative Example 1

In Comparative Example 1, permeated water in Example 1 was not made to pass through the cation remover 23 and the concentration of boron was then measured. The other conditions were the same as in Example 1.

Comparative Example 2

In Comparative Example 2, an ion remover (Amberjet EG4-HG, manufactured by ORGANO Inc.) using a mixed bed resin was used instead of the cation remover 23 in Example 1. The other conditions were the same as in Example 1.

Table 1 shows the results of measuring the specific resistance and the Na concentration in permeated water before the boron concentration measurement (after water having permeated through the two RO membrane devices was made to pass through the cation remover 23) and the concentration of boron by using the boron analyzer 21.

TABLE 1

|  | Specific resistance (MΩ · cm) | Na (ppb) | Boron (ppb) |
| --- | --- | --- | --- |
| Example 1 | 15.5 | 0.2 | 1 |
| Example 2 | 17 | 0.2 | 0.2 |
| Comparative Example 1 | 0.6 | 150 | 0.4 |
| Comparative Example 2 | 17 | 0.2 | 0.1 |

The results have demonstrated that after the treated water passed through the cation remover 23, the concentration of boron therein was able to be measured at ppb levels in Examples 1 and 2.

The concentration of boron as measured in Comparative Example 1 was lower than in Example 1. This is because the concentration of sodium ion was too high and the specific resistance of water fed was thus small, and as a result of which noise became large and the concentration of boron was unable to be measured accurately.

In Comparative Example 2, the concentration of boron was 1/10 of that in Example 1. This is because boron was removed by the mixed bed resin. Here, the concentration of boron in water having permeated through the RO membranes was unable to be measured accurately. Collectively, in Comparative Examples 1 and 2, the concentration of boron in the permeated water immediately after the RO membrane treatment was unable to be measured accurately. Thus, it was impossible to precisely operate and control the RO membranes by using the concentration of boron as an indicator.

Example 3

In Example 3, the concentration of boron was continuously monitored using, as the boron analyzer 21, an online boron meter, manufactured by GE Company, in Example 2.

Comparative Example 3

In Comparative Example 3, the concentration of boron in Comparative Example 1 was continuously monitored using the same online boron meter as in Example 3.

The results are shown in Table 2.

TABLE 2

|  | Boron (ppb) |
| --- | --- |
| Example 3 | 0.2 |
| Comparative Example 3 | unmeasurable |

In Comparative Example 3, the water quality of water fed to the online boron meter was insufficient. As a result, noise was large and the concentration of boron was thus unable to be measured accurately.

Having described our invention as related to this embodiments and Examples, it is our intention that the invention not be limited by any of the details of the description, unless otherwise specified, but rather be construed broadly within its spirit and scope as set out in the accompanying claims.

This application claims priority on Patent Application No. 2018-117270 filed in Japan on Jun. 20, 2018, which is entirely herein incorporated by reference.

DESCRIPTION OF SYMBOLS 1, 1A, 1B, 1C, 1D Boron-removing system
11 Main piping
12 Reverse osmosis membrane device (RO membrane device)
12in, 14in, 16in Inlet side
12out Outlet side
14 First RO membrane device
16 Second RO membrane device
21 Boron analyzer
22 Branch pipe
22A Branching portion
23 Cation remover
25 Concentrated water pipe
26 Pressure-regulating valve
31 Heat exchanger
32, 36 Liquid-chemical pipe
32A, 36A Merging portion
34 Alkali agent source
35 Chemical injection pump
37 Acidic liquid-chemical pipe
37A Merging portion
41 Pump
42 Pump inverter
51 Cation exchanger
53 Decarbonation unit
101 Ultrapure water production system 110 Primary pure water system
111 Tank
112 Heat exchanger
113 RO membrane
114 Ion exchanger
115 Deaerator
120 Secondary pure water system (subsystem)
121 Tank
122 Heat exchanger
123 Ultraviolet (UV) oxidation unit
124 Ion exchanger
125 UF unit
130 Pretreatment system
141 Primary main piping
142 Secondary main piping
143 Return pipe
S1, S2, S3, S4 Signal line

The invention claimed is:

1. A method of removing boron from water to be treated, comprising:
    subjecting the water to be treated to reverse osmosis membrane treatment during which water is permeated through at least one reverse osmosis membrane;
    subjecting at least part of the permeated water resulting from the reverse osmosis membrane treatment to cation-removing treatment;
    measuring a concentration of boron in the permeated water resulting from the cation-removing treatment; and
    regulating at least one of the following of (a1) to (d1) with at least one signal responsive to the concentration of boron measured in the permeated water resulting from the cation-removing treatment:
    (a1) the recovery rate of water to be treated by the reverse osmosis membrane treatment;
    (b1) the temperature of the water to be treated;
    (c1) the pH of the water to be treated; and
    (d1) a supply pressure of the water to be treated, which pressure is applied to the at least one reverse osmosis membrane during the reverse osmosis membrane treatment.

2. The method of removing boron from water to be treated according to claim 1, wherein the pH of the water to be treated by the reverse osmosis membrane treatment is regulated to 9 or higher.

3. The method of removing boron from water to be treated according to claim 1,
    wherein the reverse osmosis membrane treatment is treatment using multiple reverse osmosis membrane devices, each comprising a reverse osmosis membrane; and
    wherein the pH of the water to be supplied to and treated in at least one of the reverse osmosis membrane devices is regulated to be 9 or higher.

4. The method of removing boron from water to be treated according to claim 3, wherein at least one of the multiple reverse osmosis membrane devices is a high-pressure reverse osmosis membrane device.

5. The method of removing boron from water to be treated according to claim 3, wherein the multiple reverse osmosis membrane devices comprise a primary reverse osmosis membrane device and a secondary reverse osmosis membrane device; and a flux per effective pressure of 1 MPa is maintained through the primary reverse osmosis membrane device which is larger than a flux per effective pressure of 1 MP maintained through the secondary reverse osmosis membrane device.

6. The method of removing boron from water to be treated according to claim 1, further comprising: subjecting, before subjecting the water to be treated to the reverse osmosis membrane treatment, the water to be treated to cation-exchange treatment, followed by decarbonation treatment.

7. The method of removing boron from water to be treated according to claim 1, wherein the cation-removing treatment is conducted by using an electric regeneration-type cation remover.

8. A method of removing boron from water to be treated, according to claim 1, further comprising (e1), replacing one of the at least one of the reverse osmosis membranes responsive to the concentration of boron measured in the permeated water resulting from the cation-removing treatment.

9. A boron-removing system for removing boron from water to be treated, comprising:
    at least one reverse osmosis membrane device configured to treat water to be treated, each of the reverse osmosis membrane devices comprising a reverse osmosis membrane;
    a cation remover configured to treat at least part of water having permeated through the reverse osmosis membrane device; and
    a boron analyzer configured to measure a concentration of boron in water having been treated using the cation remover,
    wherein the system is configured to regulate at least one of the following of (a2) to (d2) with at least one signal responsive to the concentration of boron as measured using the boron analyzer:
    (a2) the recovery rate of water to be treated in the reverse osmosis membrane device;
    (b2) the temperature of the water to be treated;
    (c2) the pH of the water to be treated; and
    (d2) a supply pressure of the water to be treated, which pressure is applied to the at least one reverse osmosis membrane in the at least one reverse osmosis membrane device.

10. An ultrapure water production system, comprising:
a pretreatment system;
a primary pure water system; and
a secondary pure water system,
wherein the primary pure water system includes the boron-removing system according to claim 9.

* * * * *